United States Patent [19]
Robbins et al.

[11] Patent Number: 5,544,223
[45] Date of Patent: Aug. 6, 1996

[54] METHOD AND APPARATUS FOR PAGING A CONCENTRATED SUBSCRIBER SYSTEM FOR WIRELESS LOCAL LOOP

[75] Inventors: Barry R. Robbins; Noam A. Ziv, both of San Diego, Calif.

[73] Assignee: Qualcomm Incorporated, San Diego, Calif.

[21] Appl. No.: 382,472

[22] Filed: Jan. 31, 1995

[51] Int. Cl.$^6$ .............................. H04Q 7/30; H04Q 7/38
[52] U.S. Cl. .............................. 379/58; 379/59; 455/33.1
[58] Field of Search ..................... 379/58, 59; 455/12.1, 455/13.1, 33.1, 33.4, 34.1, 54.1, 56.1

[56] References Cited

U.S. PATENT DOCUMENTS

| | | | |
|---|---|---|---|
| 4,071,711 | 1/1978 | Beaupre et al. . | |
| 4,658,096 | 4/1987 | West, Jr. et al. | 379/59 |
| 4,677,656 | 6/1987 | Burke et al. | 379/63 |
| 4,737,975 | 4/1988 | Shafer | 379/58 |
| 4,775,997 | 10/1988 | West, Jr. et al. | 379/58 |
| 4,888,788 | 12/1989 | Teranishi et al. . | |
| 4,890,315 | 12/1989 | Bendixen et al. | 379/59 |
| 4,901,307 | 2/1990 | Gilhousen et al. | 370/18 |
| 4,922,517 | 5/1990 | West, Jr. et al. | 379/58 |
| 5,103,459 | 4/1992 | Gilhousen et al. . | |

(List continued on next page.)

OTHER PUBLICATIONS

"Flexible Rural System", *Rural Telecommunications*, by T. J. Pereira et al., May 23–25, 1988.
"Rural Telecommunnications Development In Botswana: Socio–Economic & Strategic Issues", *Rural Telecommunications*, by A. D. Clarkstone et al., Oct. 29 31, 1990.
"Telecommunications in Alaskan Villages", *The Art of Communication*, by Alex Hill et al., Jan. 16, 1981, vol. 211.
"Mar 801 (1604): Multi–Access Radio System for Rural Telephony", *35 Telettra Review*, by J. L. Adanero et al., Nov. 1983.
"Radio Linked Exchange and Concentrator Rural Telephone System (RTS)", Defendant's Exhibit (261), TM–517.

(List continued on next page.)

*Primary Examiner*—Dwayne D. Bost
*Attorney, Agent, or Firm*—Russell B. Miller; Brian S. Edmonston

[57] ABSTRACT

A method and apparatus for paging a concentrated subscriber system for wireless local loop within a cellular telephone system. Within a mobile telephone switching office (MTSO) a visitor location register is generated in which a subscriber unit identification number (SUIN) for every subscriber unit registered within the area of coverage is stored along with corresponding telephone number, last cell site, and concentrated subscriber system (CSS) status information. The SUIN can correspond to the electronic serial number (ESN), mobile identification number (MIN), or other unique identification code assigned to each subscriber unit. When a call directed to a subscriber unit having a particular telephone number is received the corresponding SUIN, CSS status information, and last cell site information of that subscriber unit are determined using the visitor location directory. In response to this determination a paging code is calculated in various manners depending on the resulting CSS status information of the subscriber unit being paged. If the subscriber unit being addressed is part of a CSS the paging code used to generate the paging message is calculated in a first manner such that it is the same for each subscriber unit within a particular CSS. If the CSS status information indicates that the subscriber unit being paged is not part of a CSS the paging code is calculated in a second manner such that it is different for each subscriber unit. A set of paging parameter are then calculated using that paging code which in the preferred embodiment include a CDMA channel, a paging channel, and a paging slot. The page message is then transmitted in accordance with those paging parameters. In the preferred embodiment the page message generation process using the paging parameters is the same as that of the prior art cellular system in order to maintain maximum compatibility with those prior art systems.

30 Claims, 4 Drawing Sheets

U.S. PATENT DOCUMENTS

| | | | |
|---|---|---|---|
| 5,119,375 | 6/1992 | Paneth et al. ............................. | 370/95 |
| 5,228,054 | 7/1993 | Rueth et al. . | |
| 5,349,631 | 9/1994 | Lee ........................................... | 379/59 |
| 5,408,515 | 4/1995 | Bhagat et al. ............................ | 379/59 |

OTHER PUBLICATIONS

"An Automatic, Fully Interconnected HF Radio Telephone System", *Communnic Asia 81*, Defendant Exhibit (1208), by E. W. Derbyshire etal., Dec. 9–12 1981.

"90935/36 Remote and Master Telephone/Radio Interface Modules", *Dantel–Lac*, Dec. 8, 1988.

"Race System (RTS 151/RTS 151)", *Technical Manual*, by Canadian Marconi Company, Defendant Exhibit 1081, Nov. 22, 1984.

"Lic. Sc. Math. Bell Telephone Mfg. Co.", *Cellular Radio Systems for Rural Radio Telecommunications*, Antwerp —Belgium.

"Microwave Radio Provides Service to Sparsely Populated Areas", *Canadian Electronics Engineering*, by D. M. Beaupre, Farinon Electric of Canada Ltd., pp. 26–28.

*(Prior Art)*

0
METHOD AND APPARATUS FOR PAGING A CONCENTRATED SUBSCRIBER SYSTEM FOR WIRELESS LOCAL LOOP

BACKGROUND OF THE INVENTION

I. Field of the Invention

The present invention relates to wireless telephone systems. More particularly, the present invention relates to a method and apparatus for paging a concentrated subscriber system for wireless local loop that allows for simplified construction of the concentrated subscriber system while maintaining maximum compatibility with prior art cellular telephone systems.

II. Description of the Related Art

Wire based or wire line telephone systems are the traditional method of providing non-mobile telephone service. Wire based telephone systems are well suited for this task because they provide high quality connections at a low operating cost and can accommodate increased demand for telephone service by the introduction of new telephone wires into the existing network. A disadvantage of wire base telephone systems is the substantial infrastructure and capital necessary for their implementation. These requirements can make wire based telephone systems uneconomical in areas that are remote or less populated, or in less developed areas where the required capital is unavailable. The result is that these less populated and remote areas often lack adequate telephone service which is detrimental to the to the economic well being of the people who live in those areas. Also, the time necessary to put the required infrastructure in place makes wire based telephone systems less desirable in areas where new telephone service must be provided quickly.

Wireless cellular telephone systems require substantially less capital and infrastructure than wire based telephone systems and therefore provide a possible alternative for providing primary telephone service. The degree to which cellular telephone systems can provide primary telephone service is limited, however, by their higher operating cost as compared to wire based telephone system which translates into a higher usage cost for the cellular telephone system subscriber. This higher usage cost limits the number of subscribers that can afford to use a cellular telephone system as their primary telephone service provider within a given area and therefore reduces the number of markets in which the use of cellular telephone systems is economical.

A cellular telephone system that provides simple telephone service at a reduced cost when compared to previous cellular telephone systems is described in co-pending U.S. patent application Ser. No. 08/384,291 entitled "Concentrated Subscriber System for Wireless Local Loop" filed concurrently herewith on Jan. 10, 1994 and assigned to the assignee of the present invention. The concentrated subscriber system described in that application includes a set of subscriber units that share a control and interface system which in the preferred embodiment incorporates code division multiple access (CDMA) digital technology because of its high bandwidth efficiency and high quality communication capability. Such a system reduces the cost of cellular telephone service incurred by each cellular telephone subscriber by spreading the cost of the control and interface system over a larger number of subscribers. This increases the number of markets in which it is economical to use cellular telephone systems as a primary provider of telephone service and therefore increases overall access to telephone service.

Many cellular telephone systems, including those using the preferred CDMA technology, page or "ring" the various subscriber units that are part of the cellular telephone system using a unique paging method for each subscriber unit or sub-set of subscriber units that are part of the cellular telephone system. This is done so that page messages can be directed to single one or a sub-set of the total number of subscriber units thereby simplifying the page monitoring process for each subscriber unit. In the case of the concentrated subscriber system, however, using multiple paging methods for paging makes the control and interface system described more complex. This is because the control and interface system must be capable of interacting in accordance with multiple different paging methods in order to monitor for paging messages directed to any one of the multiple subscriber units that are part of the concentrated subscriber system. Higher complexity is contrary the goal of the concentrated subscriber system, however, which is providing basic cellular telephone service at a reduced cost. Therefore, the use of the standard method of paging a subscriber unit in combination with a concentrated subscriber system cellular telephone system is undesirable.

SUMMARY OF THE INVENTION

Based on the forgoing a method and apparatus for paging a concentrated subscriber system for wireless local loop within a cellular telephone system is described. Within a mobile telephone switching office (MTSO) a visitor location register is generated in which a subscriber unit identification number (SUIN) for every subscriber unit registered within the area of coverage is stored along with corresponding telephone number, last cell site identification code, and concentrated subscriber system (CSS) status information. The SUIN can correspond to the electronic serial number (ESN), mobile identification number (MIN), or other unique identification code assigned to each subscriber unit. When a call directed to a subscriber unit having a particular telephone number is received the corresponding SUN, CSS status information, and last cell site information of that subscriber unit are determined using the visitor location directory.

In response to this determination, a paging code is calculated in various manners depending on the resulting CSS status information of the subscriber unit being paged. If the subscriber unit being addressed is part of a CSS the paging code used to generate the paging message is calculated in a first manner such that it is the same for each subscriber unit within a particular CSS. If the CSS status information indicates that the subscriber unit being paged is not part of a CSS the paging code is calculated in a second manner such that it is different for each subscriber unit. A set of paging parameter are then calculated using the paging code which in the preferred embodiment include a CDMA channel, a paging channel, and a paging slot. The page message is then transmitted in accordance with those paging parameters. In the preferred embodiment the page message generation process using the paging parameters is the same as that of the prior art cellular system in order to maintain maximum compatibility with those prior art systems.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for paging subscriber unit within a concentrated subscriber system for wireless local loop is described. In the following description various variables, procedures, and arraignments are described in detail. In particular, the invention is described in the context of a code division multiple access (CDMA) cellular telephone system which incorporates a method of paging having paging parameters including a CDMA channel, paging channel, and paging slot. It will be apparent to one skilled in the art that these details and specifics are not required to practice the present invention and that the present invention can be implemented within alternative cellular telephone systems or other radio wave based means of communication including satellite based systems. In other instances, various well known structures and systems are provided in block form. This is done in order to avoid unnecessarily obscuring the disclosure of the present invention.

Figure 1:
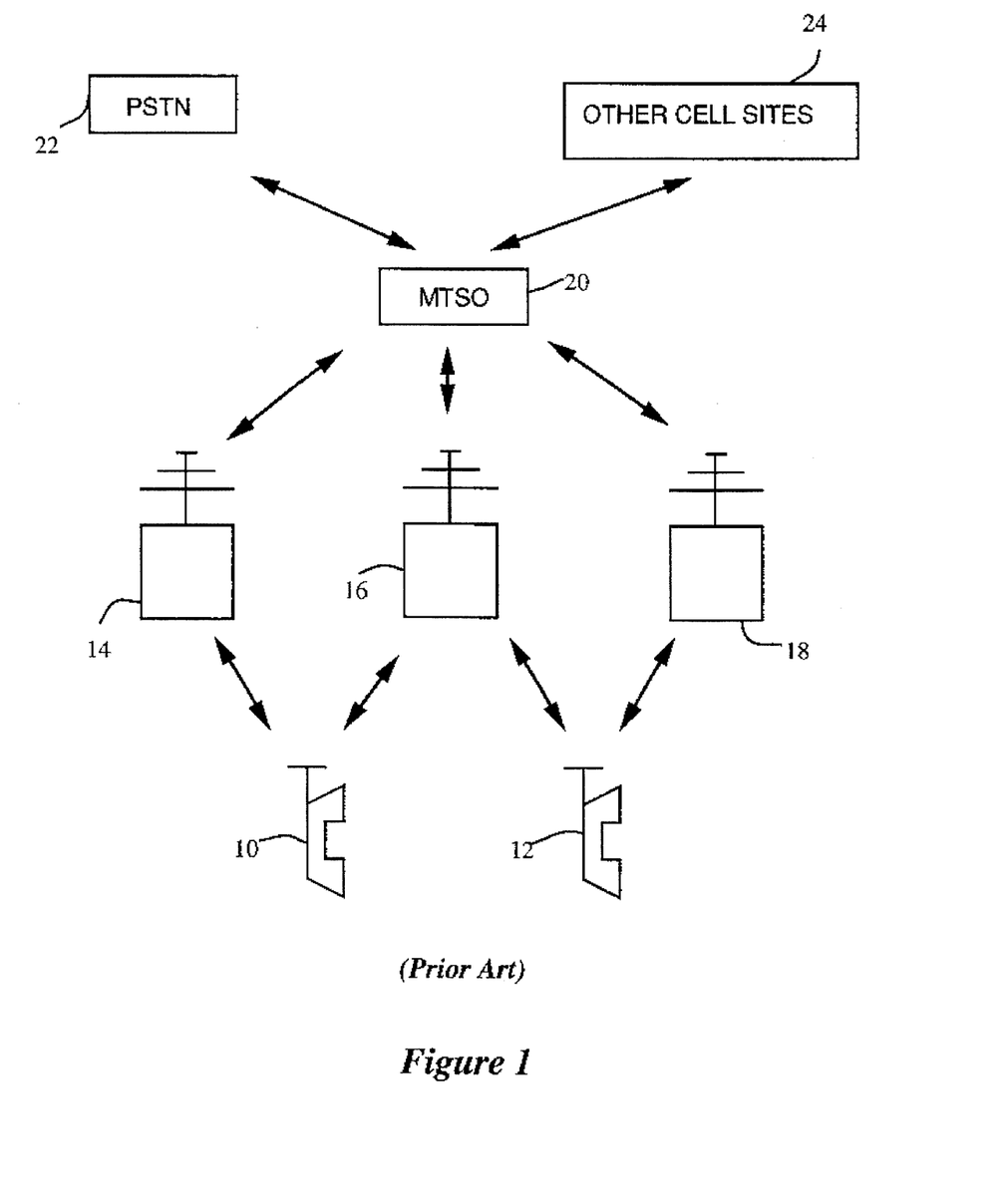
FIG. 1 is a diagram of a cellular telephone system consistent with the use of CDMA radio and modulation techniques.

FIG. 1 is an illustration of a cellular telephone system configured in a manner consistent with the use of Code Division Multiple Access (CDMA) radio wave modulation techniques. One implementation for such a CDMA cellular telephone system is described in U.S. Pat. No. 4,901,307 ('307) entitled "Spread Spectrum Multiple Access Communication System Using a Satellite or Terrestrial Repeater" and U.S. Pat. No. 5,103,459 ('459) entitled "System and Method for Generating Signal Wave forms in a CDMA Cellular Telephone System" both assigned to the assignee of the present invention, as well as in specification IS-95 from the Telecommunication Industry Association (2001 Pennsylvania Avenue, Suite 800, Wash., D.C. 20006) entitled "Mobile Station-Base Station Compatibility Standard for Dual Mode Wideband Spread Spectrum Cellular System" (IS-95). Radio Frequency (RF) signals generated in response to both incoming and outgoing phone calls in accordance with above referenced patents '459 and '307 and specification IS-95 are exchanged between subscriber units 10 and 12 and base station transceivers 14, 16 and 18. Additional subscriber units will normally also exchange such RF signals, but are not shown for ease of drawing. Base station transceivers 14, 16 and 18 communicate in various ways including ground base wires or microwave link with mobile telephone switching office (MTSO) 20 which routes the calls to public switching telephone network (PSTN) 22 and which interacts similarly with other cell sites 24. In general, subscriber units 10 and 12 do not communicate directly with one another.

As described in patents '459 and '307 and specification IS-95 the "forward link" communication that takes place from base station transceivers 14, 16, and 18 to subscriber units 10 and 12 is performed over various forward CDMA channels each of which occupies 1.23 MHz of radio frequency bandwidth. Each of these forward CDMA channels is divided into various additional channels that are separated and distinguished via the use of unique pseudo-random spreading codes that are applied to the data being transmitted. For channels that carry signals to be received by both subscriber units 10 and 12 a predetermined spreading code is used that is known by every communication unit including both subscriber units 10 and 12. For channels that carry data intended for only one subscriber units 10 or 12 a spreading code only known to that particular communication unit is used which is generally determined as a function of a unique thirty-two bit electronic serial number (ESN) stored in each subscriber unit. In addition to the ESN each subscriber unit may also be associated with a mobile identification number (MIN) which in the preferred embodiment is also 32 bits, as well as other additional unique identification codes.

The various channels within a given forward CDMA channel include a set of data channels, a synchronization channel, a pilot channel, and a set of paging channels, all transmitted from base station transceivers 14, 16 and 18 to subscriber units 10 and 12. The pilot channel carries a pilot signal that is a regularly repeated pattern phase offset slightly for each cell site in a local area which is received by every subscriber unit including subscriber units 10 and 12. The pilot signal allows subscriber units 10 and 12 to identify and become synchronized with the various base station transceiver that are within range of their communication capability. The synchronization channel carries additional synchronization information for use by both subscriber units 10 and 12. The set of data channels carry the data associated with the various communication sessions (usually phone calls) and are directed to a specific subscriber unit. The paging channels are used by the base station transceivers to notify a particular subscriber unit that a request to communicate has been received.

As also described in patents '459 and '307 and specification IS-95, the protocol for paging a subscriber unit is defined so as to evenly distribute background noise, and to reduce power consumption. This is done by dividing each paging channel into a set of paging "slots" or time windows during which paging signals directed to either subscriber units 10 and 12 may be generated, and by assigning a particular CDMA channel, paging channel and paging slot to each subscriber unit in an evenly distributed fashion. This assignment is performed via the use of a hashing function applied to the ESN of each subscriber unit under the established protocol although other unique numbers could be utilized. The hashing function yields a value that corresponds to a particular set of paging parameters including a CDMA channel, paging channel, and paging slot. The subscriber units are then configured to "listen" for a paging message over the corresponding CDMA channel and paging channel during the corresponding paging slot. Since listening for a page requires a certain amount of power, limiting the time a subscriber unit performs the listening function to a particular paging slot reduces the overall power consumption of that subscriber unit and therefore increases the life of any battery or other power storage system utilized by that subscriber unit. In general the page message itself will contain the ESN of the subscriber unit being paged in encoded form so that it can identify itself when the page is received, although other identification codes could theoretically be used.

Figure 2:
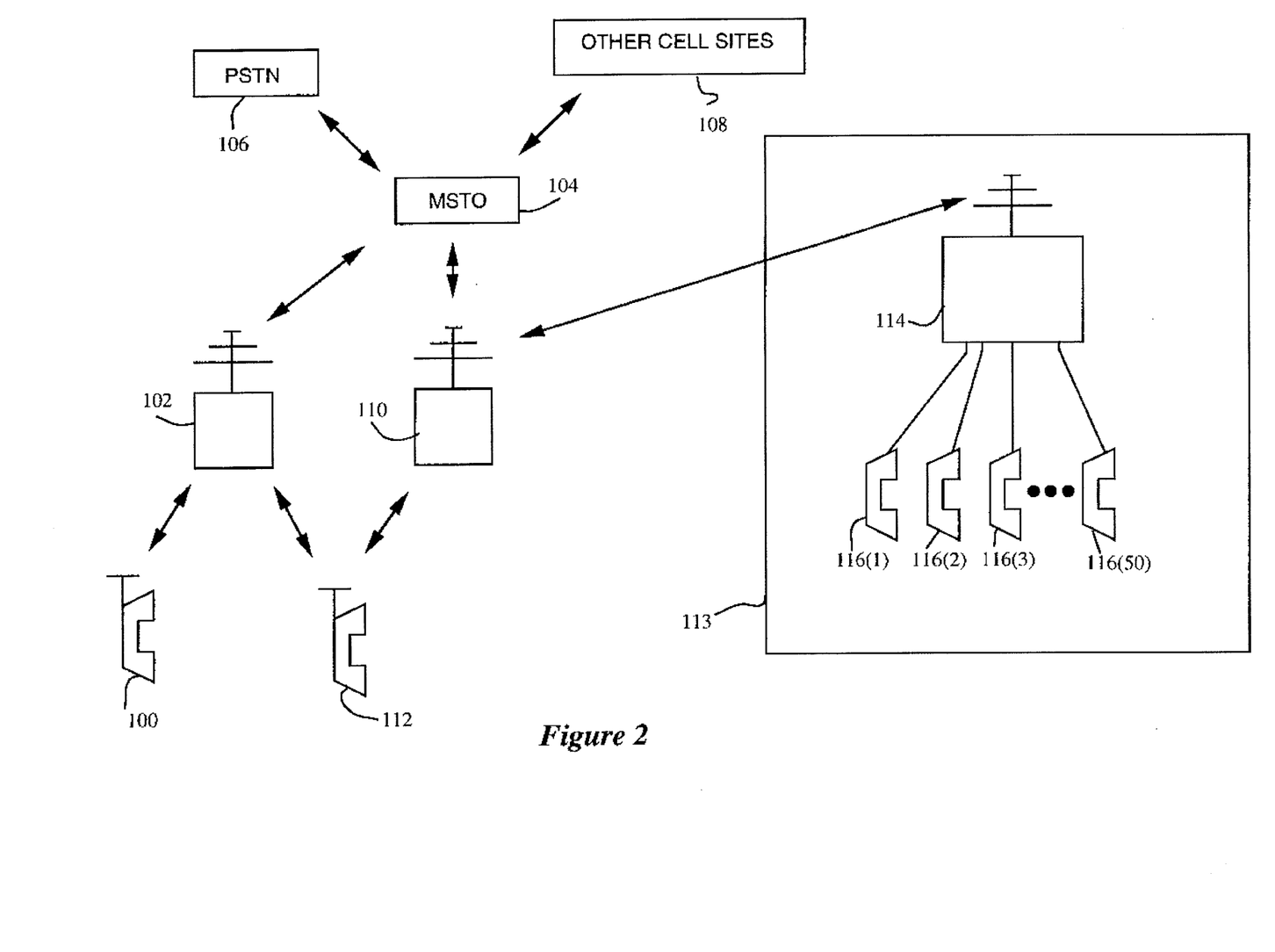
FIG. 2 is a diagram of a cellular telephone system configured in accordance with one embodiment of the invention.

FIG. 2 is a block diagram of a cellular telephone system configured in accordance with one embodiment of the present invention. Base station transceiver 102 transmits and receives radio waves modulated in accordance with the CDMA spread spectrum techniques described in above referenced patents '459 and '307 and specification IS-95 to and from subscriber units 100 and 112. Additionally, base station transceiver 102 interfaces with mobile telephone switching office (MTSO) 104 in any one of a variety of manners including microwave link, ground based T1 or E1 wire connections, or a combination thereof. MTSO 104 interfaces with public telephone switching network (PSTN) 106 allowing various communication sessions or telephone calls to be delivered between base station transceiver 102, base station transceiver 110, and other cell sites 108. Both subscriber units 100 and 112 have a unique thirty-two bit electronic serial number (ESN) as well as other unique identification codes as described above.

Base station transceiver 110 interfaces with MTSO 104 in a similar manner to base station transceiver 102 and communicates with subscriber unit 112 and concentrated subscriber system (CSS) 113 via radio waves modulated in accordance with above referenced patents '459 and '307 and specification IS-95. Within CSS 113 subscriber units 116(1) through (50) are coupled to CSS controller 114 which performs the interface function with base station transceiver 110. Subscriber units 116(1) through (50) each are also assigned a unique ESN and can be used in a manner similar to a standard telephone to initiate and receive telephone calls. While CSS controller 114 is shown coupled directly to subscriber units 116, alternative methods for exchanging information are contemplated including a simplified form of radio wave based communication. The configuration and operation of CSS controller 114 is described in further detail in the previously mentioned co-pending U.S. patent application Ser. No. 08/384,291 entitled "Concentrated Subscriber System for Wireless Local Loop."

During operation base station transceiver 110 receives requests to communicate with subscriber unit 112 and subscriber units 116 as well as other subscriber units not shown for ease of drawing from MTSO 104. In response to each request base station transceiver 110 generates a paging message directed to the corresponding cellular communication system a CDMA channel, paging channel, and paging slot determined using a paging code provided in the request. The paging code is calculated in one of two ways depending on whether the subscriber unit being paged is part of a concentrated subscriber system. If the communication unit being paged is not part of a CSS the paging code is set to a subscriber unit identification number (SUIN) associated with the subscriber unit being paged which in the preferred embodiment is the ESN of that subscriber unit, although any other unique identification code associated with the subscriber unit could be used as the SUIN including the MIN or the SUIN could be an additional unique code associated with each subscriber unit 116. If the subscriber unit being paged is a subscriber unit 116 and therefore part of a CSS the paging code is calculated in an alternative manner that will cause the page message to be generated using the same CDMA channel, paging channel and paging slot to for each subscriber unit 116.

Figure 3:
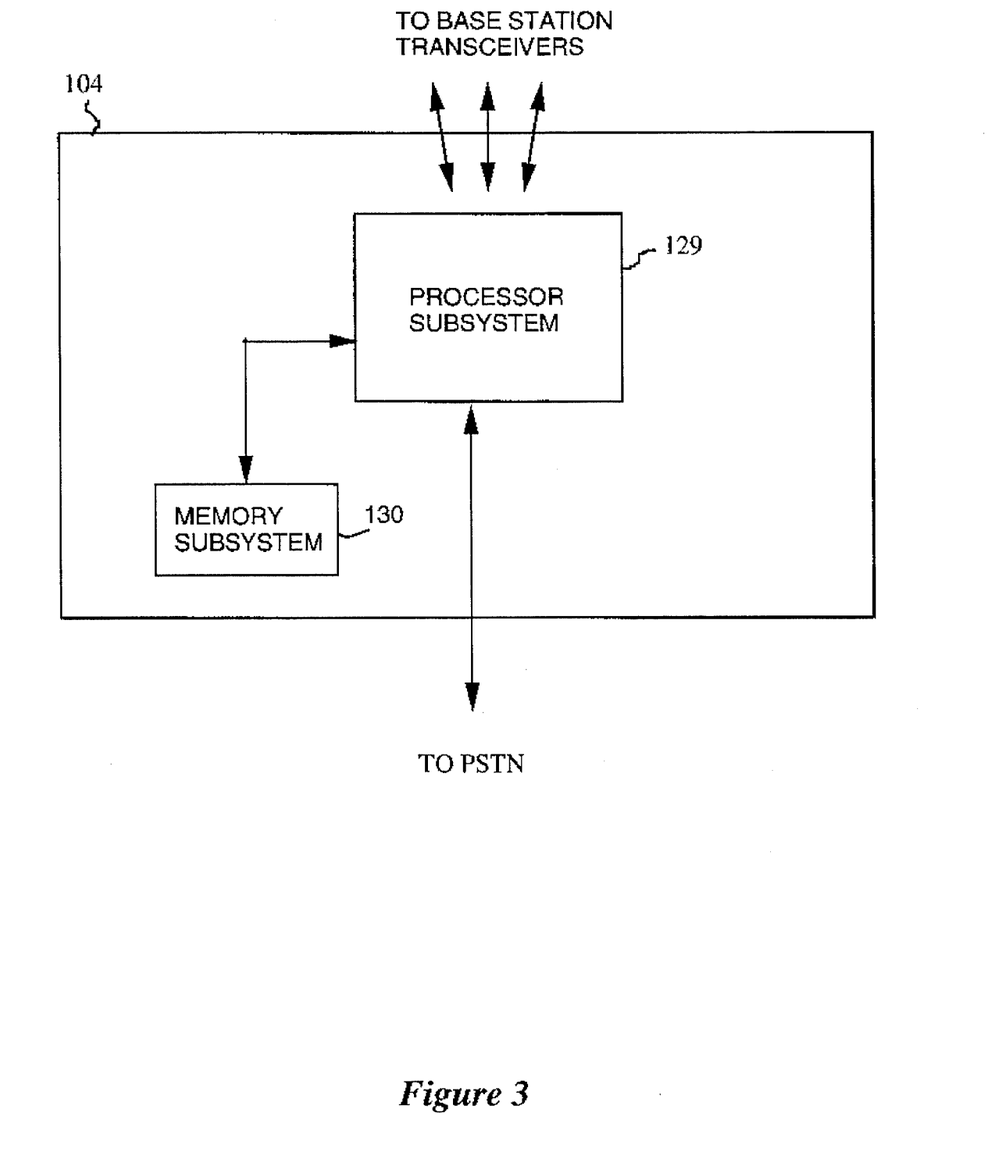
FIG. 3 is a block diagram of the mobile telephone switching office configured in accordance with one embodiment on the invention.

FIG. 3 is a block diagram of MTSO 104 when configured in accordance with the described embodiment. Processor subsystem 129 receives and transmits data to and from PSTN 106 of FIG. 2, as well as receives and transmits data to and from base stations transceivers 102 and 110 also of FIG. 2. Memory subsystem 130 is coupled to processor subsystem 129 and provides data storage functionality. In the preferred embodiment processor subsystem 129 incorporates the use of at least one microprocessor and memory subsystem 130 incorporates the use of either integrated circuit, optical, magnetic or hard disk memory, or a combination thereof. Various additional circuits and systems are included within MTSO including interface systems located between processor subsystem 129 and PSTN 106 and base station transceivers 102 and 110 that are well known in the art, but that are not shown for ease of drawing and so as not to unnecessarily obscure disclosure of the present invention.

During operation communication requests including a telephone number of the subscriber unit with which communication is being requested are received by processor subsystem 129 Processor subsystem 129 performs a look up with the telephone number provided using a visitor location register (VLR) generated and maintained within memory subsystem 130 by processor subsystem 129. The VLR is a table containing information extracted from a home location registry (HLR) also stored with memory subsystem 130 that contains information for all the active ("turned on") subscriber units that have registered with the MTSO 104. The HLR is a table containing information associated with the all subscribers having accounts with the cellular telephone operator of MTSO 104 and the associated services to which they have subscribed. While the VLR and HLR are shown located within the same memory subsystem 130 and controlled by processor subsystem 129 both of which are located within MTSO 104, it is contemplated that the two table may be maintained separately by different systems and at different locations. In the preferred embodiment VLR table contains a subscriber unit identification number (SUIN), the telephone number or numbers, the CSS status, and the last base station identification number (BID) of each subscriber unit that has registered as being activated and within the coverage area of MTSO 104. The SUIN is generally the ESN of the subscriber unit although other unique identification codes may also be substituted. This information is constantly updated as subscriber units enter and leave the area of coverage or are activated and deactivated.

The CSS status is stored in different ways in different embodiments of the invention. In one embodiment the CSS status includes a CSS status bit (CSB) indicating whether a particular subscriber unit is part of a CSS and therefore is a subscriber unit 116. Generally, a "one" indicates a positive status and a "zero" indicates a negative status although this, of course, could be switched. In an alternative embodiment the CSS status may be indicated by a concentrated subscriber system identification code (CSSIC) stored within the HLR and the VLR in lieu of or in addition to this CSS status bit. The CSSIC is a number indicating the particular CSS with which the subscriber unit is associated. A zero CSSIC generally indicates a negative CSS status, however, other values may easily be use to indicate negative CSS status. The preferred length for the CSSIC is thirty-two bits. Table I lists a set of exemplary entries stored in the VLR.

TABLE I

| SUIN | Phone number | CSB | CSSIC | Last BID |
|---|---|---|---|---|
| A16F 2051 | 619.555.1000 | 0 | 0000 0000 | 04F1 |
| A16F 4051 | 619.555.1221 | 0 | 0000 0000 | 0539 |
| A156 7151 | 619.555.1800 | 1 | 0751 64F3 | 2CF1 |
| B34A 1F35 | 619.555.1801 | 1 | 2C41 0551 | 03A7 |
| 946D 3B74 | 619.555.1805 | 1 | 04A5 2CF1 | 57F6 |
| 3578 2041 | 619.555.1900 | 1 | 6493 9DA7 | B4F1 |
| A16F 2051 | 619.555.1903 | 1 | 87F6 57F9 | 14A1 |

All numbers are in shown hex format except for the phone number which is shown in decimal format for ease of understanding although it may actually be stored in binary format like the other values. After the look up is performed a paging request is generated based on the resulting SUIN and CSS status information by processor system 129 and transmitted to the base station transceiver associated with the last BID in which the subscriber unit was located. The paging request is generally also transmitted to other base station transceivers located in adjacent cells in case the subscriber unit has moved, a practice well known in the art.

In the preferred embodiment a page request includes the MIN of the subscriber unit being paged and a paging code, which is also referred to as a paging-ESN. Other identification number may be included in the page request in lieu of or in addition to the MIN including the ESN in other embodiments of the invention. The paging code is calculated in a variety of manners depending on the CSS status of the subscriber unit being paged. If the CSS status information is negative indicating the subscriber unit being paged is not part of a CSS, the paging code is set to the SUIN, which as noted above is the ESN of the subscriber unit being paged in the preferred embodiment. This process is consistent with paging parameter calculation process of the IS-95 standard. If the CSS status information is positive, indicating the subscriber unit being paged is part of a CSS, the paging code is set to an alternative number that simplifies the page monitoring process of CSS controller 114 of FIG. 2. While in the described embodiment the paging code calculation process takes place with MTSO 104 it is also contemplated that it could take place within the base station transceiver to which the page request is transmitted.

The paging code is to set different values in different embodiments of the invention. In a first embodiment of the invention the paging code is set to a predetermined number when the CSS status of the subscriber unit being paged is positive. In a second embodiment of the invention a positive CSS status results in the paging code being set to the CSSIC of the CSS in which the modified subscriber unit being paged is located. In a third embodiment of the invention a positive CSS status results in the paging code being set to a number that is calculated by masking a portion of the SUIN of the subscriber unit being paged and applying the normal hashing function to this masked SUIN. Once again, as noted above in the preferred embodiment of the invention the SUIN is the ESN of the subscriber unit being paged although other identification numbers can also be used. In the third embodiment each subscriber unit associated with a given CSS is assigned an SUIN with an identical set of twenty high order bits, although other quantities of identical bits located elsewhere within the SUIN are contemplated and consistent with the invention. The twelve low order bits are then masked preferably with all zeros, and the paging code is set to this masked number.

Figure 4:
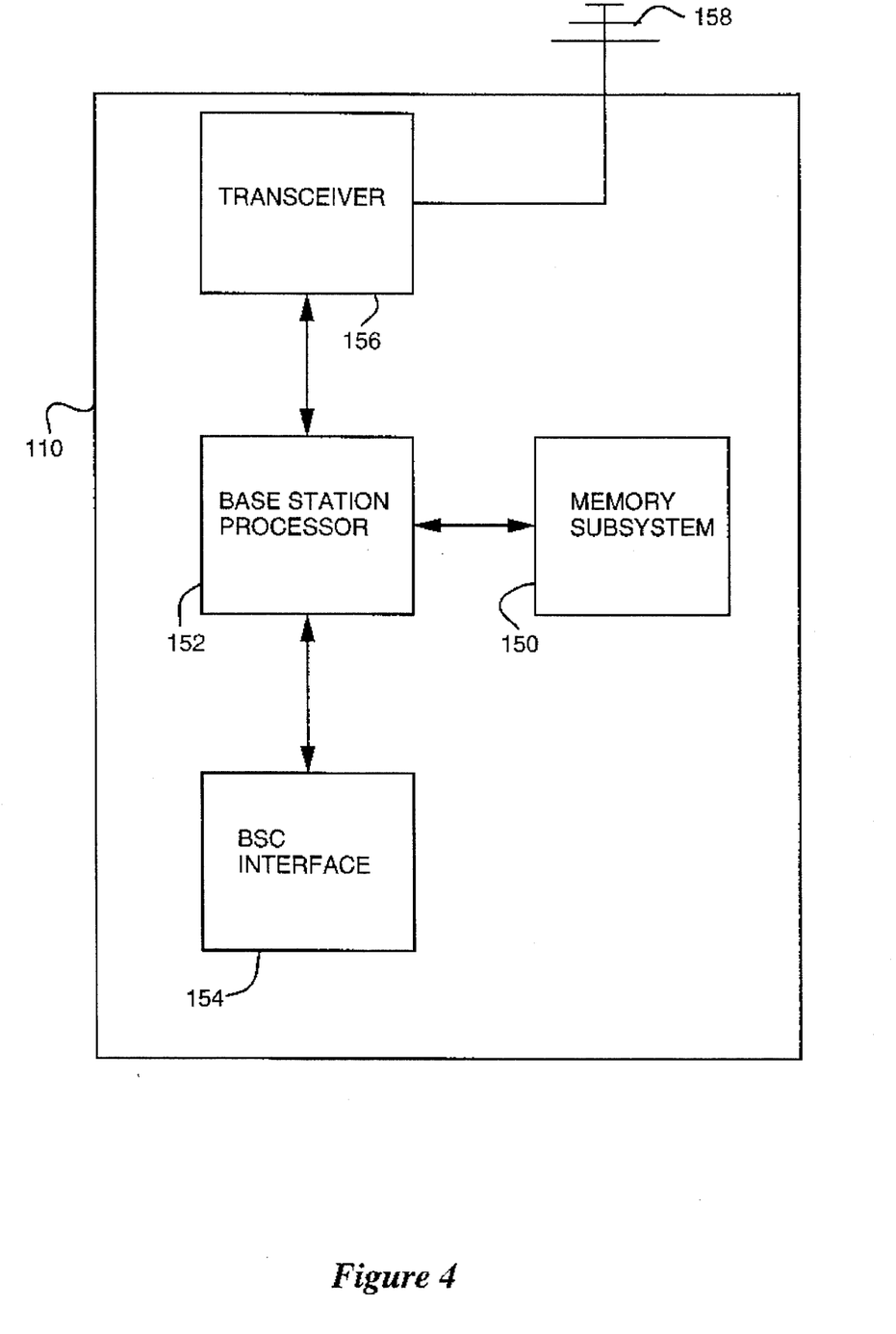
FIG. 4 is a block diagram of a base station transceiver configured in accordance with the described embodiment of the invention.

FIG. 4 is a block diagram illustrating the configuration of the various systems used to construct base station transceiver (BTS) 110 in accordance with the described embodiment of the invention. RF transceiver 156 generates radio frequency signals transmitted from antenna 158 in response to information generated by base station processor 152 which in the preferred embodiment is a microprocessor. Base station processor 152 stores and retrieves data from memory subsystem 150 in order to generate this information. MTSO interface 154 interacts with MTSO 104 of FIG. 2 and receives and transmits information to and from base station processor 152 including requests to page a subscriber unit. In the preferred embodiment memory subsystem 150 is comprised of integrated circuit, optical, or magnetic memory, or a combination thereof.

Base station processor 152 performs various functions that allow BTS 110 to control telephone calls including calculating the paging parameters including the CDMA channel, paging channel, and paging slot used to send paging messages to the various subscriber units within its area of coverage in response to paging requests received from MTSO 104. In general these paging parameters are calculated by the application of a hashing function to the paging code transmitted by MTSO 104 with any paging request. In the preferred embodiment the hashing function used is the one described in the IS-95 specification referenced above in order to keep the system as compatible as possible with the prior art, although the use of other hashing functions is contemplated.

The effect of generating the paging parameters via the application of a hashing function to a paging code that is calculated in accordance with the procedures described above is that the concentrated subscriber system can be constructed at a reduced cost and can operate within a digital cellular telephone system thereby increasing its overall usefulness. This is because in each of the three embodiments described the paging code provided will be the same for each subscriber unit associated with a particular CSS. This causes the same CDMA channel, paging channel and paging slot to be used to page each subscriber unit associated with the CSS thereby simplifying the page monitoring function of the CSS. By calculating the paging code in accordance with the prior art, however, when the subscriber unit being paged is not associated with a CSS the described system also operates correctly with subscriber units consistent with the prior art. This allows the same infrastructure to be used to provide both higher cost mobile and reduced cost non-mobile telephone service thereby increasing the number of subscribers it can serve.

The various embodiments of the invention described above each provide additional benefits. In the first embodiment of the invention, in which the paging code is set to a predetermined value when the CSS status of the subscriber unit being paged is positive, the calculation process is simplified. However, the use of the same predetermined paging code for each CSS in the first embodiment causes the associated CDMA channel, paging channel, and paging slot to be utilized significantly more often than others when multiple CSS sites are located within the area of coverage of a given base station transceiver. This causes the noise created by the paging messages to be distributed unevenly and therefore interferes with the communication of other subscribers within the cell site coverage area.

This uneven distribution is reduced in the second embodiment of the invention described above where the paging code is set to the CSSIC of the CSS in which the subscriber unit being paged is located, is provided in the paging request transmitted from MTSO 104. Using the CSSIC as the paging code will still cause the same CDMA channel, paging channel and paging slot to be used to page each subscriber unit associated with a given CSS, but will cause a different CDMA channel paging channel and paging slot to be used for subscriber units that are part of different CSS systems. This will more evenly distribute the paging signals being generated across a particular area of cellular coverage, and therefore is preferred when it is desirable to reduce such interference.

The third embodiment of the invention described above in which the paging code is set to a number calculated by making a portion of the SUIN associated with the subscriber unit being paged provides similar benefits to the second in that is more evenly distributes the generation of page message across the available CDMA channel, paging channels and paging slots. Additionally, the third embodiment reduces the amount of information that must be stored within the VLR and HLR generated within MSC 104 of FIG. 2 because the SUIN is used both to identify the subscriber unit and to recalculate the paging code. Additionally, the masking of twelve low order bits in the third embodiment to calculate the paging code allows for over ten-thousand cellular units to be assigned to a particular concentrated subscriber system. This provides unique numbers sufficient to distinguish ten thousand phones which corresponds to a four digit base ten extension common in the telecommunications industry.

Thus a method and apparatus for paging a concentrated subscriber system for wireless local loop is described. Other embodiments of the invention will be apparent to those skilled in the art. The above described embodiment is provided merely for illustrative purposes and should be construed as limiting the scope of the invention which is set forth in the following claims.

We claim:

1. A method for generating paging messages in a code division multiple access cellular telephone system comprising the steps of:
   a) tracking a concentrated subscriber system status for a subscriber unit; and
   b) generating a paging message directed to said subscriber unit in a first manner if said concentrated subscriber system status is positive, and in a second manner if said concentrated subscriber system status is negative.

2. The method as set forth in claim 1 wherein step a) comprises the steps of:
   a.1) storing a subscriber unit identification number, a telephone number, and concentrated subscriber system status information associated with said subscriber unit in a visitor location register; and
   a.2) looking up said subscriber unit identification number and said concentrated subscriber system status information in said visitor location register using said telephone number.

3. The method as set forth in claim 2 wherein step b) comprises the steps of:
   b.1) receiving said subscriber unit identification code and said concentrated subscriber system status information;
   b.2) examining said concentrated subscriber system status information;
   b.3) calculating a paging code in a first manner if said concentrated subscriber system status information is positive, and in a second manner if said concentrated subscriber status information is negative; and
   b.4) generating said paging message using said paging parameters.

4. The method as set forth in claim 3 wherein step b.3) comprises the step of setting said paging code equal to a predetermined value if said concentrated subscriber system status information is positive, and to said subscriber unit identification code if said concentrated subscriber information is negative.

5. The method as set forth in claim 3 wherein step b.3) comprises the step of setting said paging code equal to a concentrated subscriber system identification code also stored in said visitor location register if said concentrated subscriber system status information is positive, and to said subscriber unit identification code if said concentrated subscriber system status is negative.

6. The method as set forth in claim 3 wherein step b.2) comprises the step of determining if a concentrated subscriber system status bit is set.

7. The method as set forth in claim 3 wherein step b.2) comprises the step of determining if a concentrated subscriber system identification code that is part of said concentrated subscriber system status information is equal to a first value.

8. The method as set forth in claim 3 wherein said paging message includes the subscriber unit identification code of the subscriber unit being paged.

9. The method as set forth in claim 3 wherein step b.3) comprises the steps of:
   masking a set of bits within said subscriber unit identification code if said concentrated subscriber status information is positive; and
   setting said paging code to said subscriber unit identification code.

10. The method as set forth in claim 9 wherein said a set of paging parameters are calculated using said paging code wherein said paging parameters comprise a code division multiple access channel, a paging channel, and a paging slot.

11. An apparatus for generating paging messages in a cellular telephone system comprising:
    means for tracking a concentrated subscriber system status for a subscriber unit and for generating a paging code in a first manner if said concentrated subscriber system status is positive, and in a second manner if said concentrated subscriber system status is negative; and
    means for generating a paging message based on said paging code.

12. The apparatus as set forth in claim 11 wherein said means for tracking comprises:
    means for storing an electronic serial number, a telephone number, and concentrated subscriber system status information associated with said subscriber unit in a visitor location register; and
    means for looking up said electronic serial number and said concentrated subscriber system status information in said visitor location register using said telephone number.

13. The apparatus as set forth in claim 12 wherein step b) comprises:
    means for receiving said subscriber unit identification code and said concentrated subscriber system status information;
    means for examining said concentrated subscriber system status information;
    means for calculating paging parameters in a first manner if said concentrated subscriber system status information is positive, and in a second manner if said concentrated subscriber status information is negative.

14. The apparatus as set forth in claim 13 wherein said means for calculating comprises:
    means for setting said paging code equal to a predetermined value if said concentrated subscriber system status information is positive, and to said subscriber unit identification code if said concentrated subscriber information is negative.

15. The apparatus as set forth in claim 13 wherein said means for calculating comprises:
    means for setting said paging code equal to a concentrated subscriber system identification code also stored in said visitor location register if said concentrated subscriber system status information is positive, and to said subscriber unit identification code if said concentrated subscriber system status is negative.

16. The apparatus as set forth in claim 13 wherein said means for examining comprises means for determining if a concentrated subscriber system status bit is set.

17. The apparatus as set forth in claim 13 wherein said means for examining comprises means for determining if a concentrated subscriber system identification code that is part of said concentrated subscriber system status information is equal to a first value.

18. The apparatus as set forth in claim 13 wherein said paging message includes the subscriber unit identification code of the subscriber unit being paged.

19. The apparatus as set forth in claim 13 wherein said means for calculating comprises:

means for masking a set of bits within said subscriber unit identification code if said concentrated subscriber status information is positive; and means for setting said paging code to said subscriber unit identification code.

20. The apparatus as set forth in claim 19 wherein said set of values comprise a code division multiple access channel, a paging channel, and a paging slot.

21. A system for generating paging messages in a code division multiple access cellular telephone system comprising:

a mobile telephone switching office for tracking a concentrated subscriber system status for a subscriber unit, and for generating a paging message directed to said subscriber unit in a first manner if said concentrated subscriber system status is positive, and in a second manner if said concentrated subscriber system status is negative; and base station transceiver system for generating said paging message using said paging code.

22. The system as set forth in claim 21 wherein said mobile telephone switching office comprises memory system for storing an subscriber unit identification code, a telephone number, and concentrated subscriber system status information associated with said subscriber unit in a visitor location register; and processor system for looking up said subscriber unit identification code and said concentrated subscriber system status information in said visitor location register using said telephone number.

23. The system as set forth in claim 22 wherein said processor system examines said concentrated subscriber system status information, and calculates a paging code in a first manner if said concentrated subscriber system status information is positive, and in a second manner if said concentrated subscriber status information is negative.

base station transceiver system for generating said paging message using said paging code.

24. The system as set forth in claim 23 wherein said processor system calculates said paging code by setting said paging code equal to a predetermined value if said concentrated subscriber system status information is positive, and to said subscriber unit identification code if said concentrated subscriber information is negative.

25. The system as set forth in claim 23 wherein said processor system sets said paging code to a concentrated subscriber system identification code also stored in said visitor location register if said concentrated subscriber system status information is positive, and to said subscriber unit identification code if said concentrated subscriber information is negative.

26. The system as set forth in claim 23 wherein said processor system examines said CSS information by determining if a concentrated subscriber system status bit is set.

27. The system as set forth in claim 23 wherein said processor determines if a concentrated subscriber system identification code that is part of said concentrated subscriber system status information is equal to a first value.

28. The system as set forth in claim 23 wherein said page message includes the subscriber unit identification code of the subscriber unit being paged.

29. The system as set forth in claim 23 wherein said processor system calculates said paging code by:

masking a set of bits within said subscriber unit identification code if said concentrated subscriber status information is positive; and setting said paging code to said subscriber unit identification code.

30. The system as set forth in claim 29 wherein said base station transceiver uses said paging code to calculate a set of paging parameters wherein said paging parameters comprise a code division multiple access channel, a paging channel, and a paging slot.

\* \* \* \* \*